(12) United States Patent
Agnus

(10) Patent No.: US 12,624,652 B2
(45) Date of Patent: May 12, 2026

(54) MOTOR FLUID DRAINING TOOL KIT ASSEMBLY

(71) Applicant: Noah Agnus, Nightmute, AK (US)

(72) Inventor: Noah Agnus, Nightmute, AK (US)

( * ) Notice: Subject to any disclaimer, the term of this patent is extended or adjusted under 35 U.S.C. 154(b) by 470 days.

(21) Appl. No.: 18/367,856

(22) Filed: Sep. 13, 2023

(65) Prior Publication Data

US 2025/0084775 A1     Mar. 13, 2025

(51) Int. Cl.
*F01M 11/04* (2006.01)
*B63H 20/00* (2006.01)
*F16N 31/00* (2006.01)

(52) U.S. Cl.
CPC ....... *F01M 11/0408* (2013.01); *B63H 20/002* (2013.01); *F01M 11/04* (2013.01); *F16N 31/00* (2013.01); *F16N 31/002* (2013.01); *F16N 31/006* (2013.01)

(58) Field of Classification Search
CPC .... F01M 11/04; F01M 11/0408; F16N 31/00; F16N 31/002; F16N 31/004; F01P 11/0276; F01P 3/205; F01P 2011/065; F01P 2011/066; B65D 85/68; B65D 2585/6802; B65D 2585/6875; B65D 2585/6877; B63H 20/001; B63H 20/002; B63H 2020/008; B63H 21/386; B65F 1/0013; B65F 1/141; B65F 1/1415
See application file for complete search history.

(56) References Cited

U.S. PATENT DOCUMENTS

| | | | | |
|---|---|---|---|---|
| 2,574,295 | A * | 11/1951 | Schoon | B65B 67/1227 |
| | | | | 222/470 |
| 3,587,508 | A * | 6/1971 | Pearce | B63H 20/36 |
| | | | | 440/71 |
| 3,874,478 | A * | 4/1975 | Mantell, Jr. | F01M 11/0408 |
| | | | | 251/144 |
| D294,799 | S | 3/1988 | Vilkofsky, Jr. | |
| 5,121,776 | A | 6/1992 | Kovach | |
| 5,630,451 | A | 5/1997 | Bernard | |
| 5,967,200 | A * | 10/1999 | Hall | F16N 31/006 |
| | | | | 141/311 A |
| 6,701,978 | B1 | 3/2004 | Buchanan | |
| 6,863,249 | B1 * | 3/2005 | Alvord | B60R 9/02 |
| | | | | 248/339 |
| 8,656,967 | B2 * | 2/2014 | Switzer | B65D 85/68 |
| | | | | 114/361 |
| 10,196,202 | B1 | 2/2019 | Clavizzao | |
| 10,457,359 | B1 * | 10/2019 | Epps | B63B 59/045 |
| 2013/0001015 | A1 | 1/2013 | Bettendorf | |
| 2013/0108190 | A1 | 5/2013 | Flowers | |
| 2021/0381642 | A1 | 12/2021 | Shimkonis | |

FOREIGN PATENT DOCUMENTS

WO      WO2021248148      9/2021

* cited by examiner

*Primary Examiner* — Ajay Vasudeva

(57)      ABSTRACT

A motor fluid draining tool kit assembly for collecting oil expelled from an outboard motor includes a flexible bag suspended from a hanger rod that is affixed to an L-shaped mounting bracket and two elastic straps. The assembly can be removably attached to an outboard motor beneath a valve by tying the two elastic straps around the assembly and the outboard motor. Fluid can then drain out of the motor and into the flexible bag. After the fluid is drained, the flexible bag can be removed from the hanger rod for disposal of the fluid.

13 Claims, 4 Drawing Sheets

MOTOR FLUID DRAINING TOOL KIT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to systems and methods for collecting oil from an outboard motor and more particularly pertains to new systems and methods for collecting oil from an outboard motor for collecting oil expelled from an outboard motor.

(2) Description of Related Art Including Information Disclosed Under 37 CFR 1.97 and 1.98

The prior art relates to systems and methods for collecting oil from an outboard motor.

BRIEF SUMMARY OF THE INVENTION

An embodiment of the disclosure meets the needs presented above by generally comprising a flexible bag suspended from a hanger rod that is affixed to an L-shaped mounting bracket and two elastic straps. The assembly can be removably attached to an outboard motor beneath a valve by tying the two elastic straps around the assembly and the outboard motor. Fluid can then drain out of the motor and into the flexible bag. After the fluid is drained, the flexible bag can be removed from the hanger rod for disposal of the fluid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
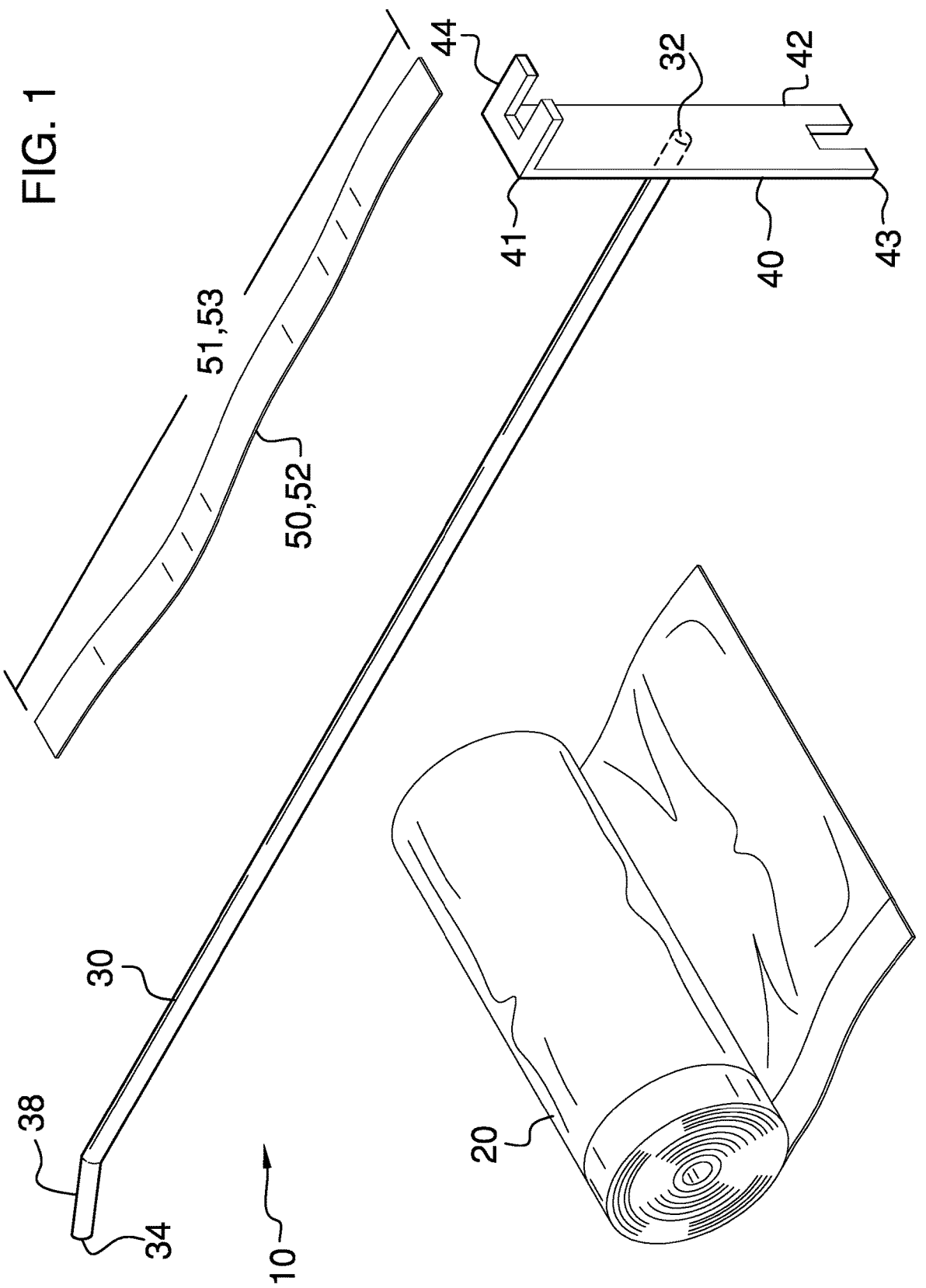
FIG. 1 is an isometric view of a motor fluid draining tool kit assembly according to an embodiment of the disclosure.
Figure 2:
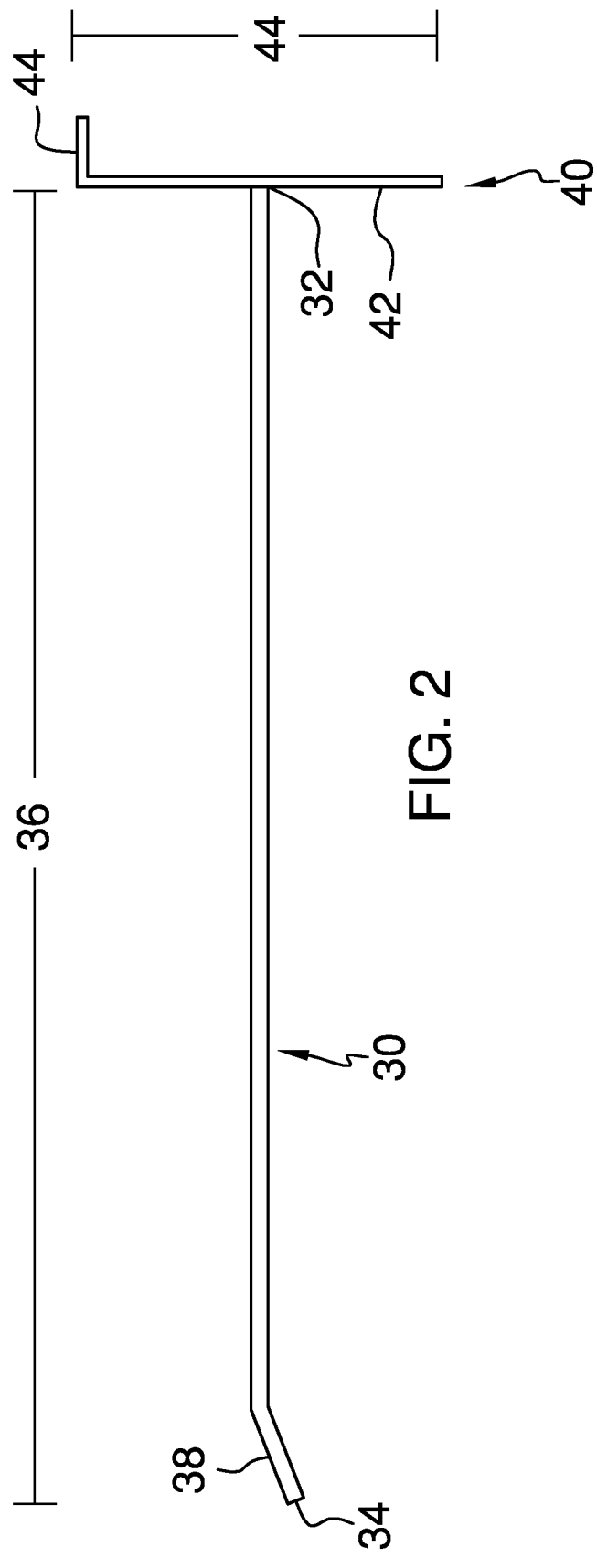
FIG. 2 is a side view of an embodiment of the disclosure.
Figure 3:
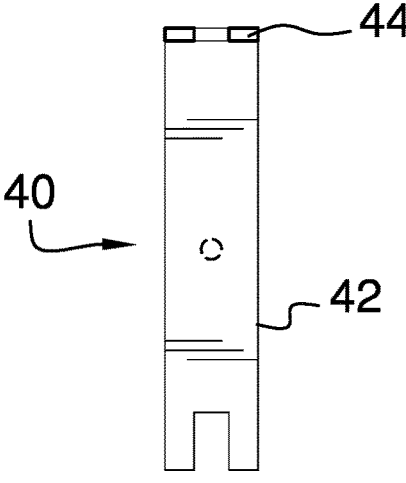
FIG. 3 is a front view of an embodiment of the disclosure.
Figure 4:
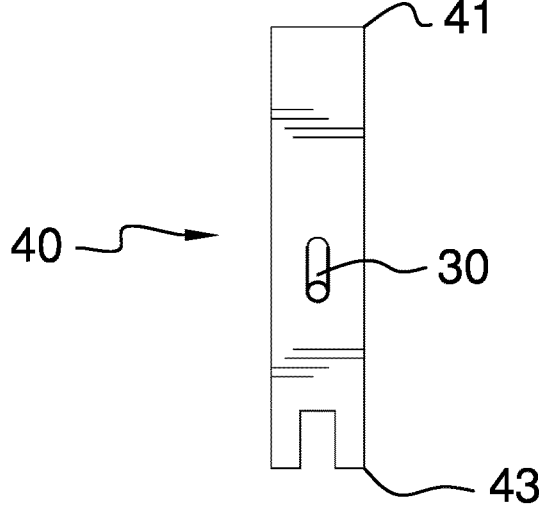
FIG. 4 is a back view of an embodiment of the disclosure.

With reference now to the drawings, and in particular to FIGS. 1 through 5 thereof, new systems and methods for collecting oil from an outboard motor embodying the principles and concepts of an embodiment of the disclosure and generally designated by the reference numeral 10 will be described.

As best illustrated in FIGS. 1 through 5, the motor fluid draining tool kit assembly 10 generally comprises a fluid collection kit system for collecting oil or other fluids 16 that are expelled through a valve 12 of an outboard motor 14. Exemplary embodiments of the motor fluid draining tool kit assembly 10 include a flexible bag 20, a hanger rod 30 affixed to an L-shaped mounting bracket 40, and two elastic straps 50, 52.

The flexible bag 20 has an opening 22 extending across a top side 23 of the flexible bag 20, the opening 22 permitting access to an interior pocket 21 of the flexible bag 20. Exemplary embodiments of the flexible bag 20 may further include a first handle 24 and a second handle 26 that are attached to the flexible bag 20 proximate to the opening 22. In some embodiments, the first handle 24 and the second handle 26 may be configured to contract the opening 22, thereby restricting access to the interior pocket 21. Certain embodiments of the flexible bag 20 may be disposable.

The hanger rod 30 includes a distal end 32 and a proximal end 34. The first handle 24 and the second handle 26 of the flexible bag 20 are generally configured for placement on the hanger rod 30 between the distal end 32 and the proximal end 34. In such a configuration, the flexible bag 20 may be suspended beneath the hanger rod 30, with the opening 22 facing upward toward the hanger rod 30. In some embodiments, the hanger rod 30 has a rod length 36 ranging between 2 feet and 5 feet. The hanger rod 30 may be formed of a durable and inflexible rod material such as metal or plastic. The proximal end 34 may further include a bent section 38 forming an obtuse angle with the hanger rod 30. For example, the bent section 38 may be integrally formed with the hanger rod. The bent section 38 may improve the stability of the flexible bag 20 while suspended from the hanger rod 30.

The L-shaped mounting bracket 40 generally comprises a vertical portion 42 and a horizontal portion 44. The vertical portion 42 generally includes a first end 41 and a second end 43. In embodiments, the horizontal portion 44 extends outwardly from the first end 41. The vertical portion 42 may be affixed to the distal end 32 of the hanger rod 30 such that the hanger rod 30 extends perpendicularly outward from an approximate midsection between the first end 41 and the second end 43. Generally, the hanger rod 30 will extend in an opposite direction from the horizontal portion 44. Some embodiments of the L-shaped mounting bracket 40 may have a bracket length 46 ranging between 4 inches and 10 inches. Embodiments of the L-shaped mounting bracket 40 may be formed of a durable and inflexible bracket material such as metal or plastic. In some embodiments, the hanger rod 30 and the L-shaped mounting bracket 40 may be formed of the same material or combination of materials.

Figure 5:
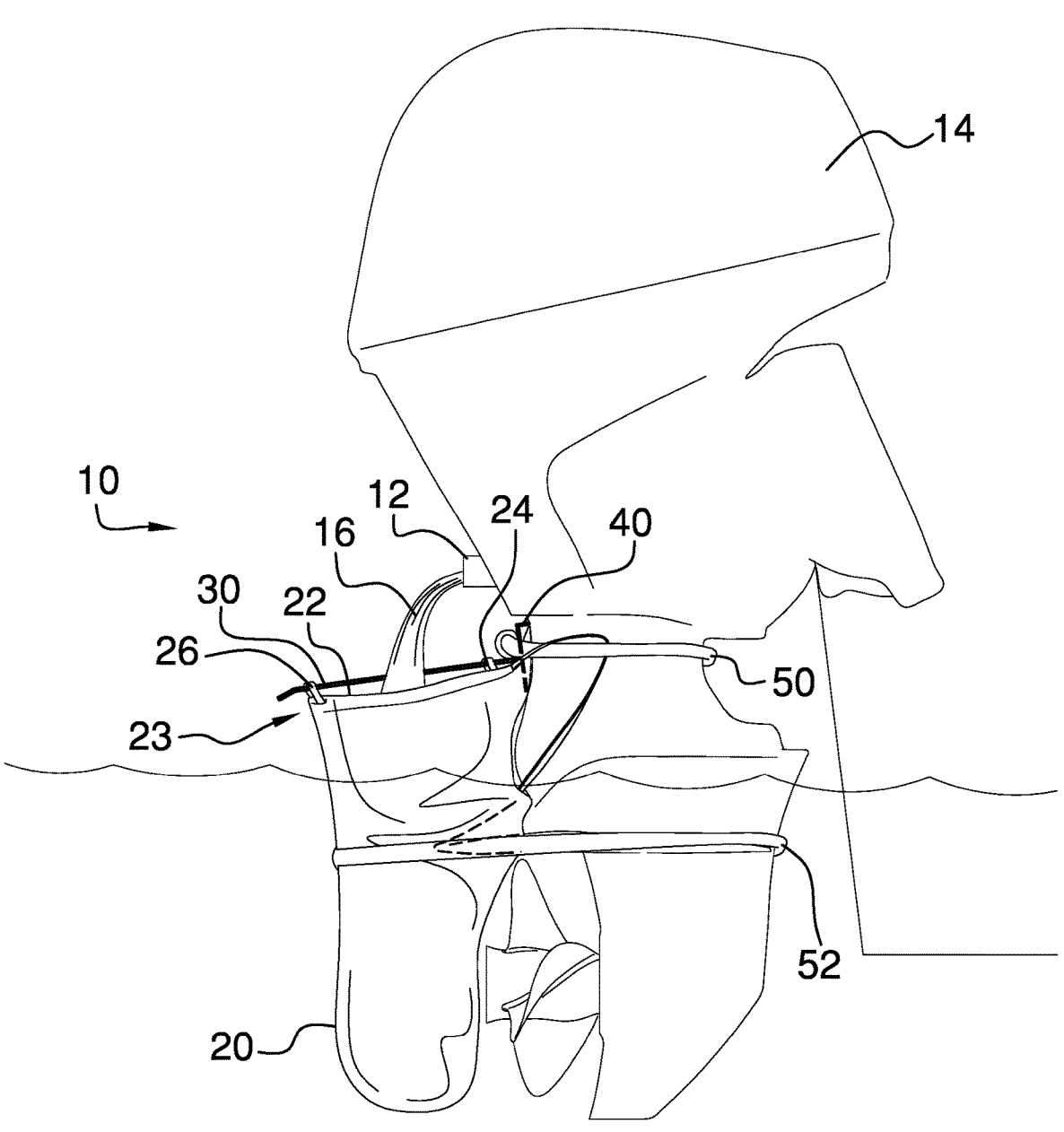
FIG. 5 is an in-use view of an embodiment of the disclosure.

As shown most clearly in FIG. 5, the first elastic strap 50 is generally configured to wrap through the first handle 24 of the flexible bag 20, around the L-shaped mounting bracket 40 and around the outboard motor 14. The first elastic strap 50 is generally further configured to stably and removably attach the L-shaped mounting bracket 40 to the outboard motor 14 such that the hanger rod 30 extends outwardly and away from the outboard motor 14. When mounted in this position, the flexible bag 20 is suspended beneath the valve 12 of the outboard motor 14. Exemplary embodiments of the first elastic strap 50 may have a first elastic strap length 51 ranging between 2 feet and 5 feet.

As shown most clearly in FIG. 5, the second elastic strap 52 is generally configured to wrap around the flexible bag 20 and the outboard motor 14 below the first elastic strap 50. The second elastic strap 52 is generally configured to provide support for the flexible bag 20 and stabilize the flexible bag 20 while the fluid 16 is expelled from the valve 12. The second elastic strap 50 may have a second elastic strap length 53 ranging between 2 feet and 5 feet.

In use, the motor fluid draining tool kit assembly 10 may be assembled as shown in FIG. 5. Specifically, the user can place the L-shaped mounting bracket 40 against the outboard motor 14 such that the horizontal portion 44 makes contact with the outboard motor 14 and the hanger rod 30 extends outwardly away from the outboard motor 14 beneath the valve 12. Then, the user may wrap the first elastic strap 50 through the first handle 24, around the L-shaped mounting bracket 40, and around the outboard motor 14. The first elastic strap 50 may be tied snugly enough around the motor fluid draining tool kit assembly 10 and the outboard motor 14 so that the motor fluid draining tool kit assembly 10 can retain its position relative to the outboard motor 14. The second elastic strap 52 may be tied slightly below the first elastic strap 50, wrapping around the flexible bag 20 and the outboard motor 14 to improve the stability of the flexible bag 20 when fluid collects in the interior pocket 21.

Once the motor fluid draining tool kit assembly 10 is stably affixed to the outboard motor 14, the user may open the valve 12 to expel the fluid 16 through the valve 12 into the interior pocket 21. After all fluid is collected in the flexible bag 20, the user may untie the first elastic strap 50 and the second elastic strap 52 and remove the flexible bag 20 from the hanger rod 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fluid collection kit system for collecting fluid expelled through a valve of an outboard motor, the fluid collection kit system comprising:

a flexible bag having an opening extending across a top side of the flexible bag, the opening permitting access to an interior pocket of the flexible bag, a first handle and a second handle being attached to the flexible bag proximate the opening;

a hanger rod having a distal end and a proximal end, the first handle and the second handle being configured for placement on the hanger rod between the distal end and the proximal end thereby suspending the flexible bag beneath the hanger rod;

an L-shaped mounting bracket having a vertical portion and a horizontal portion, the vertical portion having a first end and a second end, the horizontal portion extending outwardly from the first end;

the vertical portion being affixed to the distal end of the hanger rod, the hanger rod extending in an opposite direction from the horizontal portion;

a first elastic strap being configured to wrap through the first handle of the flexible bag, around the L-shaped mounting bracket and around the outboard motor, the first elastic strap being configured to stably and removably attach the L-shaped mounting bracket to the outboard motor such that the hanger rod extends outwardly and away from the outboard motor and the flexible bag is suspended beneath the valve of the outboard motor; and a second elastic strap being configured to wrap around the flexible bag and the outboard motor below the first elastic strap, the second elastic strap being configured to provide support for the flexible bag and stabilize the flexible bag on the hanger rod while the fluid is expelled from the valve.

2. The fluid collection kit system of claim 1, wherein the flexible bag is disposable.

3. The fluid collection kit system of claim 1, wherein the first handle and the second handle are configured to contract the opening thereby restricting access to the interior pocket.

4. The fluid collection kit system of claim 1, the hanger rod further comprising a rod length ranging between 2 feet and 5 feet.

5. The fluid collection kit system of claim 1, wherein the hanger rod is formed of a durable and inflexible rod material.

6. The fluid collection kit system of claim 5, wherein the durable and inflexible rod material is metal or plastic.

7. The fluid collection kit system of claim 1, the proximal end further comprising a bent section forming an obtuse angle with the hanger rod, the bent section being integrally formed with the hanger rod.

8. The fluid collection kit system of claim 1, wherein the hanger rod extends perpendicularly outward from an approximate midsection between the first end and the second end.

9. The fluid collection kit system of claim 1, the L-shaped mounting bracket having a bracket length ranging between 4 inches and 10 inches and being formed of a durable and inflexible bracket material.

10. The fluid collection kit system of claim 1, the first elastic strap further comprising a first elastic strap length ranging between 2 feet and 5 feet.

11. The fluid collection kit system of claim 1, the second elastic strap further comprising a second elastic strap length ranging between 2 feet and 5 feet.

12. A fluid collection kit system for collecting fluid expelled through a valve of an outboard motor, the fluid collection kit system comprising:
   a flexible bag having an opening extending across a top side of the flexible bag, the opening permitting access to an interior pocket of the flexible bag, a first handle and a second handle being attached to the flexible bag proximate the opening, the first handle and the second handle being configured to contract the opening thereby restricting access to the interior pocket;
   a hanger rod having a distal end and a proximal end, the first handle and the second handle being configured for placement on the hanger rod between the distal end and the proximal end thereby suspending the flexible bag beneath the hanger rod, the hanger rod having a rod length ranging between 2 feet and 5 feet, the hanger rod being formed of a durable and inflexible rod material, the durable and inflexible rod material being metal or plastic;
      the proximal end having a bent section forming an obtuse angle with the hanger rod, the bent section being integrally formed with the hanger rod;
   an L-shaped mounting bracket having a vertical portion and a horizontal portion, the vertical portion having a first end and a second end, the horizontal portion extending outwardly from the first end;
      the vertical portion being affixed to the distal end of the hanger rod, the hanger rod extending perpendicularly outward from an approximate midsection between the first end and the second end, the hanger rod extending in an opposite direction from the horizontal portion;
      the L-shaped mounting bracket having a bracket length ranging between 4 inches and 10 inches, the L-shaped mounting bracket being formed of a durable and inflexible bracket material;
   a first elastic strap being configured to wrap through the first handle of the flexible bag, around the L-shaped mounting bracket and around the outboard motor, the first elastic strap being configured to stably and removably attach the L-shaped mounting bracket to the outboard motor such that the hanger rod extends outwardly and away from the outboard motor and the flexible bag is suspended beneath the valve of the outboard motor, the first elastic strap having a first elastic strap length ranging between 2 feet and 5 feet; and
   a second elastic strap being configured to wrap around the flexible bag and the outboard motor below the first elastic strap, the second elastic strap being configured to provide support for the flexible bag and stabilize the flexible bag on the hanger rod while the fluid is expelled from the valve, the second elastic strap having a second elastic strap length ranging between 2 feet and 5 feet.

13. A method for collecting fluid expelled through a valve of an outboard motor, the method comprising:
   assembling a fluid collection kit system, the fluid collection kit system comprising
      a flexible bag having an opening extending across a top side of the flexible bag, the opening permitting access to an interior pocket of the flexible bag, a first handle and a second handle being attached to the flexible bag proximate the opening, the first handle and the second handle being configured to contract the opening thereby restricting access to the interior pocket;
      a hanger rod having a distal end and a proximal end, the first handle and the second handle being configured for placement on the hanger rod between the distal end and the proximal end thereby suspending the flexible bag beneath the hanger rod, the hanger rod having a rod length ranging between 2 feet and 5 feet, the hanger rod being formed of a durable and inflexible rod material, the durable and inflexible rod material being metal or plastic;
         the proximal end having a bent section forming an obtuse angle with the hanger rod, the bent section being integrally formed with the hanger rod;
      an L-shaped mounting bracket having a vertical portion and a horizontal portion, the vertical portion having a first end and a second end, the horizontal portion extending outwardly from the first end;
         the vertical portion being affixed to the distal end of the hanger rod, the hanger rod extending perpendicularly outward from an approximate midsection between the first end and the second end, the hanger rod extending in an opposite direction from the horizontal portion;
         the L-shaped mounting bracket having a bracket length ranging between 4 inches and 10 inches, the L-shaped mounting bracket being formed of a durable and inflexible bracket material;
      a first elastic strap being configured to wrap through the first handle of the flexible bag, around the L-shaped mounting bracket and around the outboard motor, the first elastic strap being configured to stably and removably attach the L-shaped mounting bracket to the outboard motor such that the hanger rod extends outwardly and away from the outboard motor and the flexible bag is suspended beneath the valve of the outboard motor, the first elastic strap having a first elastic strap length ranging between 2 feet and 5 feet;
      a second elastic strap being configured to wrap around the flexible bag and the outboard motor below the first elastic strap, the second elastic strap being configured to provide support for the flexible bag and stabilize the flexible bag on the hanger rod while the fluid is expelled from the valve, the second elastic strap having a second elastic strap length ranging between 2 feet and 5 feet;
   placing the L-shaped mounting bracket against the outboard motor such that the horizontal portion makes contact with the outboard motor and the hanger rod extends outwardly away from the outboard motor beneath the valve;

wrapping the first elastic strap through the first handle, around the L-shaped mounting bracket, and around the outboard motor;

tying the first elastic strap snugly enough so that the fluid collection kit system can retain its position relative to the outboard motor;

tying the second elastic strap around the flexible bag and the outboard motor slightly below the first elastic strap;

opening the valve to expel the fluid from the valve into the interior pocket of the flexible bag;

untying the first elastic strap and the second elastic strap; and removing the flexible bag from the hanger rod.

\* \* \* \* \*